Nov. 4, 1947.  S. D. RUSSELL  2,430,082
AUXILIARY FEEDER BLADES
Filed June 28, 1945
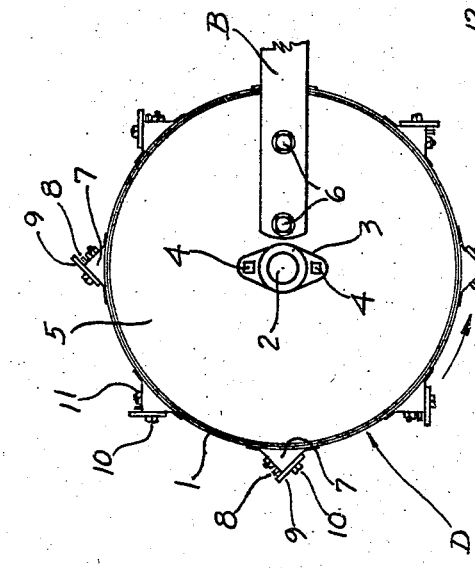
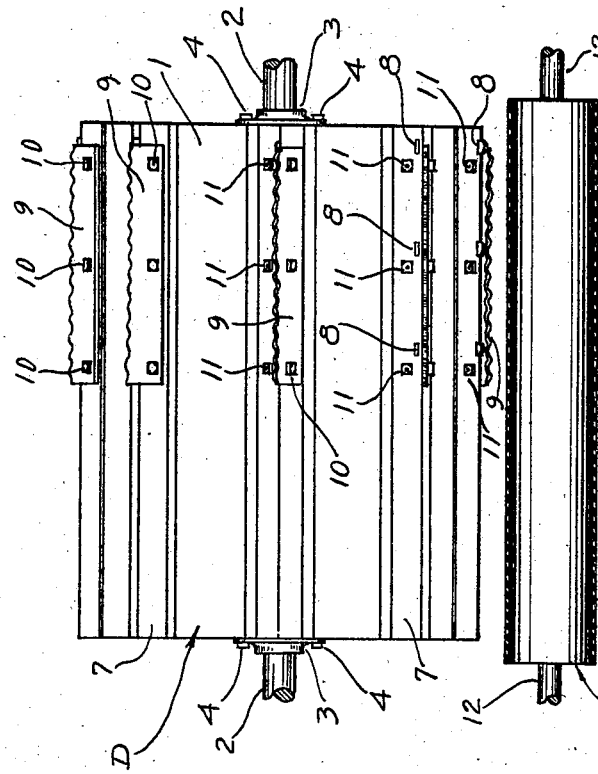
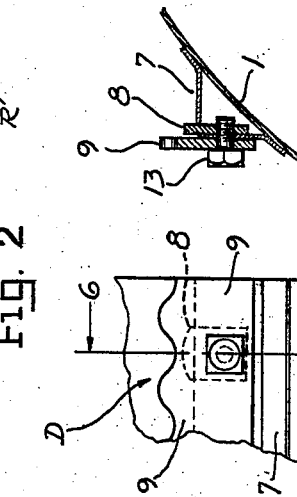
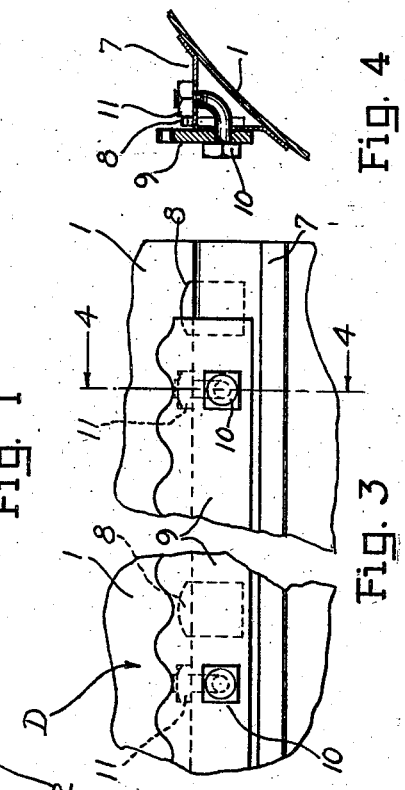
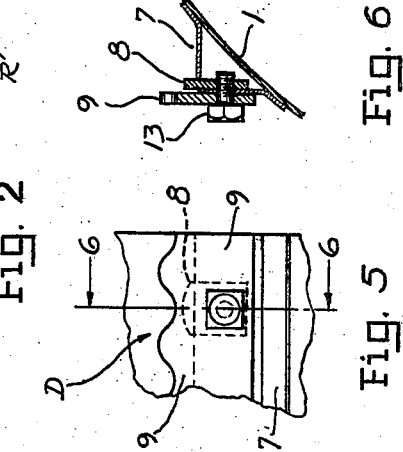
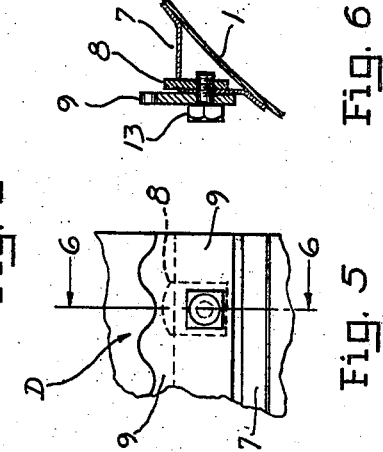
INVENTOR.
Stanley D Russell
BY
Emerson B Donnell
ATTORNEY.

Patented Nov. 4, 1947

2,430,082

UNITED STATES PATENT OFFICE 2,430,082

AUXILIARY FEEDER BLADES

Stanley D. Russell, Racine, Wis., assignor to J. I. Case Company, Racine, Wis., a corporation of Wisconsin Application June 28, 1945, Serial No. 602,055

3 Claims. (Cl. 198—167)

This invention relates to feeder means used particularly in balers and similar machines into which hay or other material is being fed for baling.

More particularly, this invention relates to the feeder drum on a baler for use in baling hay, and an object of this invention is to generally improve the construction and operation of devices of this class. One object is to provide an auxiliary feeding means to supplement that furnished as standard equipment, so that hay which is coarse and dry will be properly fed to the compressing chamber.

A further object is to provide auxiliary feed members which can be attached or removed readily from the drum when so desired.

Other objects and advantages of the invention will become apparent from a consideration of the following detailed description, taken in connection with the accompanying drawing, wherein a satisfactory embodiment of the invention is shown.

It is to be understood that the invention is not limited to the details disclosed but it includes all such variations and modifications as fall within the spirit of the invention, as herein expressed.

In the annexed drawings

Figure 1 is a view showing a baler feeder drum such as is used on balers and which has the invention mounted thereon. A typical baler feed apron is shown beneath the drum.

Figure 2 shows a side view of the arrangement of Figure 1.

Figure 3 shows an enlarged fragmentary view of the invention.

Figure 4 is a section taken at 4—4 of Figure 3.

Figure 5 is an enlarged fragmentary view showing a modified mounting of the invention.

Figure 6 shows a section taken at 6—6 of Figure 5.

Generally described in reference to the drawing: D is a feeder drum as used on a typical baler and supported by brackets B, only one of which is shown. Drum D floats over a conveying apron A which apron travels upon rollers R, only one of which is shown. The drum D and the apron A both travel in the same direction as shown by the arrows, so as to carry hay or other material to the baling chamber.

Describing the invention more in detail, drum D is rotated by a sprocket or similar means not shown, and floats above apron A so as to accommodate various quantities of hay passing between drum D and apron A. Drum D comprises a cylindrical portion 1, which is fixed to a shaft 2, and which shaft is journalled in flanges 3 which are secured by bolts 4 to the end covers 5. End covers 5 do not rotate, and are fixedly secured to brackets B by bolts 6. Further description of the details of the drum will not be made as they are fully set forth in applicant's Patent No. 2,362,861, November 14, 1944, and do not concern the present invention.

Member 1, in this instance, has attached around the circumference thereof, a plurality of ribs 7 which extend parallel to shaft 2 of drum D. These ribs are secured to member 1 by welding or any other suitable method. Ribs 7 have lugs 8 inserted near one end of the drum D, which protrude from ribs 7 as shown in the various views. These ribs 7 and lugs 8 under normal conditions serve to urge the hay or other material between the apron A and drum D. However, it is found that under unusual conditions, as when baling extremely coarse or dry hay, that auxiliary feeder members are desirable for the proper feeding of the material to the baling chamber. These members are not needed or desired under normal conditions and therefore should be readily removable. It is the purpose of this invention to provide such means.

In the preferred form of this invention, the member 9 consists of a relatively long plate which is secured to the drum and which is allowed to protrude above the lugs 8. In this instance, the means used for mounting member 9 is the bolts 10 and nuts 11. The members 9 are so positioned on the drum portion 1 that they contact the hay. The exposed edge of members 9 is formed with a serrated, scalloped or notched edge so as to more readily grip the hay. One member 9 is secured to each of the ribs 7. Bolts 10, owing to the peculiar construction of ribs 7, must be bent as shown in Figure 4, and inserted through the two walls of the said rib. Bolt 10, after being inserted through members 9, and through both walls of ribs 7, is secured by nut 11. Before members 9 are secured by bolt 10, the distance between apron A and the member 9 is adjusted for proper operation.

Apron A, above mentioned, is located a suitable distance below drum D, and is carried by rollers R of which there are two. Roller R, as shown, rotates on shaft 12, which is turned by suitable mechanism which is not shown, as it is not a part of this invention.

Figure 5 shows a modification of this invention with respect to the mounting of the members 9 on ribs 7. In this instance holes are threaded into ribs 7 and lugs 8, and the mounting screws 13 are used to secure members 9 to the ribs 7. The adjustment which was mentioned in the preferred mounting is obviously applicable to the mounting in the case of the modification.

It is apparent that with this construction, it is very easy to change the baler feed drum from one for normal use such as baling hay under ordinary conditions, to the baling of hay that is coarse and dry. Such a change would require very little of the operator's time.

The above being a complete description of an illustrative embodiment of the invention and what is claimed as new and desired to be secured by Letters Patent of the United States is:

1. In a baler feed drum, the combination of a member having a rotatable outer cylindrical periphery, a plurality of ribs permanently united with said rotatable outer periphery, each rib having surfaces disposed at an angle to each other and meeting at an apex directed outwardly from said periphery, a plurality of auxiliary blades, each blade being in contact with one of said surfaces and extending outwardly therefrom beyond said apex, and means engaging said ribs and adapted for removably fastening said auxiliary blades in position on said ribs.

2. In a baler feed drum, the combination of a member having a rotatable outer cylindrical periphery, a plurality of ribs permanently united with said rotatable outer periphery, each rib having outwardly converging wall portions, a plurality of auxiliary blades each blade being in contact with one of said surfaces and extending outwardly therefrom beyond the margin of said rib, and means for securing said blade to said rib comprising a bolt having two portions arranged at an angle to each other, said portions passing through said converging walls and having a head portion disposed parallel to one wall and a nut portion disposed parallel to the other wall.

3. In a baler, the combination of a feeding device comprising an endless traveling apron, a feed drum floatingly disposed above said apron and including a rotatable outer cylindrical periphery, a plurality of ribs permanently united with said rotatable outer periphery, each rib having surfaces disposed in converging relation to each other, a plurality of auxiliary blades, each blade being in contact with one of said surfaces and extending outwardly therefrom in position to cooperate with said endless apron to urge material between itself and said apron, and means engaging said ribs and adapted for removably fastening said auxiliary blades in position on said ribs.

STANLEY D. RUSSELL.

REFERENCES CITED

The following references are of record in the file of this patent:

UNITED STATES PATENTS

| Number | Name | Date |
|---|---|---|
| 224,104 | Morgan | Feb. 3, 1880 |
| 744,994 | Barton | Nov. 24, 1903 |
| 1,213,192 | Heebner | Jan. 23, 1917 |
| 2,196,645 | Sailberlich | Apr. 9, 1940 |
| 2,301,088 | Stahl | Nov. 3, 1942 |